May 26, 1964 H. KÖPPEN 3,134,315
PHOTOGRAPHIC CAMERAS
Filed Oct. 31, 1961
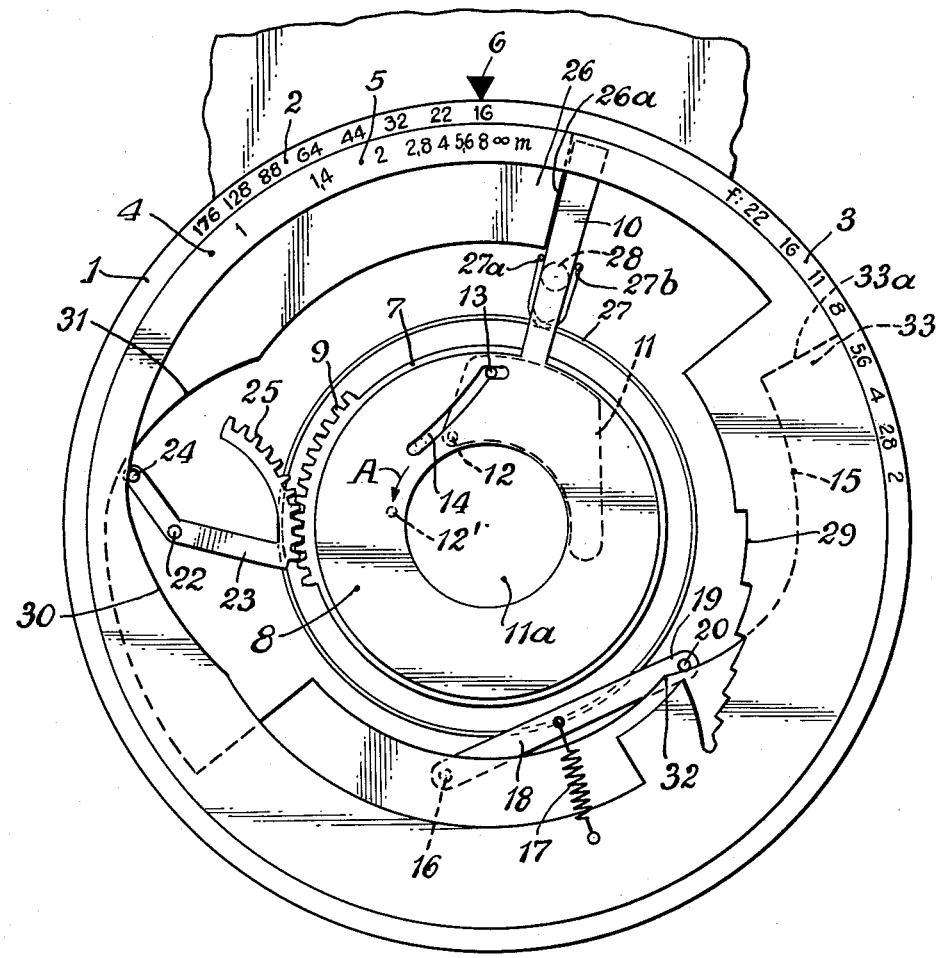

United States Patent Office 3,134,315
Patented May 26, 1964

3,134,315
PHOTOGRAPHIC CAMERAS
Heinz Köppen, Stuttgart, Germany, assignor to Zeiss
Ikon Aktiengesellschaft, Stuttgart, Germany
Filed Oct. 31, 1961, Ser. No. 149,018
Claims priority, application Germany Nov. 11, 1960
15 Claims. (Cl. 95—64)

The invention relates to improvements in photographic cameras which are equipped with means for attaching thereto a flash gun so that not only daylight exposures but also flash bulb exposures can be produced. When the guide number of the flash bulb and the distance of the object to be photographed from the camera are known, then the required size of the diaphragm aperture for making a satisfactory exposure can be calculated by the camera user in accordance with the equation:

Diaphragm aperture = guide number : distance

The same equation is employed in photographic cameras which are provided with a so-called automatic diaphragm which facilitates a flash bulb operation when the guide number is constant. Such an automatic diaphragm is provided with a coupling between the distance adjusting member and the diaphragm adjusting member which has the result that the diaphragm aperture is automatically adjusted to the required size when a distance adjustment takes place. The selection of a distance which is too great or too small is not possible with any given constant guide number since in view of the existing mechanical coupling between the adjusting rings the stops arranged in the diaphragm mtchanism limit the distance adjustment.

The conditions, however, are different when a camera is provided with an automatic diaphragm or a correspondingly constructed photographic objective which permits the employment of any one of a plurality of flash bulb guide numbers. Such a camera or camera objective is the object of the present invention.

The present invention provides means which in dependence of the adjusted guide number and the adjusted distance change the diaphragm aperture automatically, whereby additional means are provided which in dependence of the adjusted guide number limit the distance adjusting range automatically.

It is therefore an object of the invention to provide a camera objective with a guide number ring having a guide number scale and with a distance adjusting ring having a distance scale. The guide number ring is provided on its inner circumference with a control cam for cooperation with a distance limiting member, preferably a limiting lever, while the distance adjusting ring is provided on its inner side with a limiting lever or, more specifically, with a catch member on this limiting lever which cooperates with a number of steps on a so-called ratchet cam. The limiting lever is rotatable about a stationary axis and is urged by a spring against the control cam on the guide number ring and accordingly, when this guide number ring is rotatably adjusted, the control cam on the same causes a rotatable movement of the limiting lever so that the free end of this lever provided with the mentioned catch member, when the camera objective has been adjusted to low guide number values, assumes a small angle of incidence relative to the ratchet cam on the distance adjusting ring while, when the camera objective has been adjusted to high guide numbers, the mentioned lever assumes a large angle of incidence with respect to this ratchet cam. The steps on this ratchet cam on the distance adjusting ring are arranged in such a manner and are of such a construction that the steps which correspond to great distances are arranged adjacent the catch element on the limiting lever and are positioned rather deep, while the steps which correspond to short distances are arranged with respect to the catch element in such a manner that they form increased parts of the ratchet cam. The steps of the ratchet cam increase in length from the long distances toward the short distances whereby corresponding to the intervals on the distance adjusting ring the width of the steps increases with decreasing distance.

Another object of the invention is to provide the mentioned guide number ring with a diaphragm aperture scale which is circumferentially displaced from the guide number scale on this ring. When the camera objective is to be used for daylight exposure, the guide number ring is rotated away from a stationary index until the diaphragm aperture scale comes into registration with this index. Means are provided, such as disconnecting cams, which render the automatic diaphragm adjusting means in response to a distance adjustment inoperative so that the camera user is able to adjust the camera objective to any desired diaphragm aperture and distance.

The invention will now be described in more detail with reference to the accompanying drawing which illustrates diagrammatically a front elevation view of a photographic objective according to the invention.

Referring to the single figure of the drawing, the camera objective is provided with a guide number ring 1 which forms at the same time the diaphragm adjusting ring used for a manual adjustment of the diaphragm aperture when making daylight exposures with the camera to which the objective is attached. This ring 1 is provided with a guide number scale 2 and circumferentially displaced thereof with a diaphragm aperture scale 3. Adjacent to this combined guide number and diaphragm adjusting ring 1 is arranged a distance adjusting ring 4 which is provided with a distance scale 5. The rings 1 and 4 are arranged concentrically about the optical axis of the camera objective and all scales 2, 3 and 5 are adapted to be adjusted relatively to a common stationary index mark 6 arranged on a stationary part of the objective mount or on the camera casing. The adjustable diaphragm in the objective mount is provided with a first rotatable diaphragm cage 7 and with a second rotatable diaphragm cage 8. These cages 7 and 8 are illustrated for the sake of a better understanding of the drawing as having different diameters. For the same reason the adjusting rings 1 and 4 are illustrated as having different diameters. The first diaphragm cage 7 is provided on a portion of its outer circumference with exterior gear teeth 9 while the second diaphragm cage 8 is provided with a radially outwardly extending control arm 10.

For simplicity's sake there is illustrated only one diaphragm segment 11 of the diaphragm and this segment is connected by a pin 12 with the first diaphragm cage 7 and by a pin 13 with the second diaphragm cage 8. The pin 12 forms at the same time a stationary rotative axis for this diaphragm segment 11, while the pin 13 is arranged within a slot 14 and depending upon its position in this slot 14 the particular position of the diaphragm segment 11 is determined. All of the other diaphragm segments are mounted in the same manner and in their entirety form the diaphragm aperture 11a.

The guide number and diaphragm adjusting ring 1 is provided on its inner circumference with a cam 15 which controls the pivotal movement of a lever 18 which is pivotally supported at one of its ends about a stationary axis 16. A spring 17 is attached with one of its ends to approximately the center portion of the lever 18 and causes the lever 18 to constantly engage with its free end 19 the cam 15. The free end of the lever 18 carries an outwardly extending pin 20 which forms a catch member as will be described hereinafter in greater detail.

The guide number and diaphragm adjusting ring 1 is also provided with a control member 26 which engages with a radial shoulder 26a one side of the arm 10 of the second diaphragm cage 8 and rotatably adjusts the latter. When the ring 1 is adjusted to higher guide numbers, the adjustment of the cage 8 takes place in a diaphragm closing direction. Both sides of the arm 10 are engaged by the radially outwardly bent ends 27a and 27b of an Omega spring 27 which extends concentrically about the optical axis of the camera objective. The ends of the spring 27, when the latter is not spread apart, are in engagement with a stationary pin 28 arranged between the ends of the spring. These upwardly bent ends 27a and 27b of the Omega spring 27 permit the first diaphragm cage 7 to follow the adjustment toward both ends, but it will always be returned by the spring 27 into the rest position shown in the drawing.

The distance adjusting ring 4 is provided on its inner circumference with a cam 30 which controls the pivotal movement of an angle lever 23 which is pivotally mounted between its ends about a fixed axis 22. The cam 30 engages a pin 24 at one end of the angle lever 23. A not illustrated spring keeps this angle lever 23 always under a certain tension in such a manner that the pin 24 on the angle lever 23 is in constant engagement with the cam 30. The other free end of the lever 23 carries a toothed segment 25 which is in engagement with the circumferential gear teeth 9 arranged on the first rotatable diaphragm cage 7.

The distance adjusting ring 4 is also provided with a ratchet cam 29 provided with a plurality of steps the width of which corresponds to the adjusting intervals on the distance scale 5, while the height of the steps increases with decreasing distance values of the distance scale 5. The pin 20 on the lever 18 is provided for the purpose of engaging the individual radially extending abutment faces on the ratchet cam 29 in order to obtain an automatic limitation of the exposure range available to the camera user. The cam 15 on the ring 1 is so constructed and arranged that it gives the lever 18 or the pin 20 thereon, respectively, a small angle of incidence relative to the ratchet cam 29 when the ring 1 is adjusted to a low guide number. However, the pin 20 will form with the cam 29 a continuously greater angle of incidence the higher the guide number on the guide number scale 2 has been adjusted. In this manner the result is obtained that when the ring 1 is adjusted to a low guide number, for instance to the guide number 16, the entire distance range from 8 meters to 1 meter is available for flash exposures which would correspond to a diaphragm adjustment of from f:2 to f:16.

It is clear from the foregoing that when the ring 1 is adjusted to a high guide number, for instance to a guide number 176, the angle of incidence of the lever 18 and therewith the angle of the pin 20 relative to the steps on the ratchet cam 29 has become so great that only the exposure distance of 8 meters is available while all other exposure distances are automatically blocked. Any shorter distances are not possible because it is not possible to adjust the diaphragm to an aperture smaller than f:22.

The distance adjusting ring 4 has also a control cam 30 on its inner circumference and this cam 30 has the purpose of causing a pivotal movement of the angle lever 23 depending upon the distance to which the camera is to be adjusted, whereby the diaphragm aperture required for the adjusted distance is automatically adjusted. The drawing indicates that at a guide number 16 and the adjusted distance of 8 meters, which has to be considered the upper limit for flash bulb exposures, the diaphragm is completely open. When the camera is adjusted to a shorter distance, then the pin 24 on the angle lever 23 moves into the range of the stronger curved portions of the cam 30 so that the toothed segment 25 moves downwardly or clockwise and effects a rotation of the first rotatable diaphragm cage 7 in a counterclockwise direction. This has the result that the axis of rotation of the pin 12 is moved into a lower position as is indicated by the arrow A and 12' which results in a movement of the diaphragm segment 11 in a direction to reduce the size of the diaphragm aperture 11a and therewith the amount of light passing through the camera objective.

In order to adjust the diaphragm aperture not only when the distance is adjusted but also when the guide number is adjusted, there is provided on the common guide number and diaphragm adjusting ring 1 the previously mentioned member 26. This control member 26 as previously described engages one side of the radial arm 10 of the second diaphragm cage 8 and effects a rotation of the second diaphragm cage 8 in the clockwise direction when the ring 1 is adjusted to a higher guide number. This causes in view of the accompanying movement of the pin 13 a stepwise closing movement of the diaphragm segment 11.

The operation of the camera for flash bulb operation is therefore such that during the adjustment to different guide numbers and distance values the diaphragm in the photographic objective is automatically adjusted to the correct values.

When smaller distance values are adjusted by rotating the distance adjusting ring 4, the diaphragm aperture by means of the cam 30 on the distance adjusting ring 4, the angle lever 23 and the gearing 25, 9 is reduced in size. This adjustment of the diaphragm by the distance adjusting ring 4 is effected with the assistance of the first rotatable diaphragm cage 7 and the rotation of the segment 11 about the pin 12.

The adjustment of the diaphragm upon adjusting the ring 1 to a desired guide number takes place by means of the control member 26 on the ring 1 and by means of the radial arm 10 of the second diaphragm cage 8 which is engaged by the shoulder 26a of the member 26. As a result of an adjustment of the ring 1 to higher guide numbers, the second diaphragm cage 8 with the pin 13 thereon rotates in clockwise direction whereby the size of the diaphragm aperture 11a is decreased.

The automatic limitation of the exposure range in dependence of the adjusted guide numbers takes place in this manner that the cam 15 provided on the guide number and diaphragm adjusting ring 1 raises and lowers the lever 18. The cam 15 is so constructed and arranged that the pin 20 on the lever 18 at low adjusted guide numbers assumes the highest position and the smallest angle of incidence with respect to the ratchet cam 29, while on the other hand upon adjustment of the ring 1 to higher guide numbers the lever 18 assumes a lower position and a greater angle of incidence with respect to the ratchet cam 29. Upon the adjustment to low guide numbers almost the entire flash bulb distance range can be employed by the camera user before the pin 20 engages one of the steps on the ratchet cam 29. If, however, the camera is adjusted to high guide numbers, then the pin 20 will engage one of the first and lowest steps on the ratchet cam 29 and this means that the exposure range is limited to a smaller range of distances.

The cam 30 on the distance adjusting ring 4 has not only the property of a control cam, but also of a compensating cam in order to accommodate the non-linear interval sections of the distance scale to the linear adjusting path of the diaphragm mechanism.

In order to employ the camera for daylight exposures and for a manual adjustment of the diaphragm aperture, the following arrangements have to be made. The ring 1 has, as already explained, in addition to its guide number scale 2 also a diaphragm aperture scale 3. If the camera is to be changed from flash bulb exposures to daylight exposures, then the desired diaphragm value on the the scale 3 is moved in alignment with the stationary index 6. The ring 1 is further provided with a disconnecting cam 31 which has the purpose to move during this exposure change from "Flash" to "Day Light" the angle lever 23 into a position which does not prevent the manual adjustment of the diaphragm. Furthermore, there is provided a second disconnecting cam 32 which moves the lever 18 including the pin 20 thereon to a position completely outside of the range of the ratchet cam 29. Finally, there is provided on the ring 1 a second control member 33 with a radial shoulder 33a which comes into engagement with one side of the radial arm 10 on the second diaphragm cage 8 so that the diaphragm aperture may be adjusted to the desired size.

When the ring 1 for the purpose of making daylight exposures is rotated in the direction in which the manual diaphragm adjustment is employed, the disconnecting cam 31 causes the angle lever 23 to move downwardly into an extreme position which causes a corresponding rotation of the first rotatable diaphragm cage 7. This causes a displacement of the pin 12 of the diaphragm segment 11 into the position indicated at 12' and this has the further result that the diaphragm segment 11 is adjusted to form an aperture of its smallest value, namely to the value $f{:}22$ as indicated on the diaphragm scale 3. At the same time the pin 13 of the second diaphragm cage 8 is moved into its lowest position in the guide slot 14. When now the diaphragm is adjusted to a greater aperture, then the member 33 urges the radial arm 10 of the second diaphragm cage 8 in counterclockwise direction and this has the effect that the pin 13 moves step by step upwardly in the guide slot 14 so that the diaphragm aperture is opened step by step.

A limitation of the adjusted exposure range does no longer take place since the free end 19 of the lever 18 and the pin 20 thereon in this adjustment of the camera objective to manual diaphragm adjustment has reached the disconnecting cam 32 and thereby has been pivoted into a position in which an engagement of the pin 20 with the steps of the ratchet cam 29 is impossible. Therefore, the camera may now be operated as a conventional daylight exposure camera whereby diaphragm apertures and distances may be freely selected as long as the stationary index 6 remains within the range of the diaphragm adjusting scale 3 on the ring 1.

What I claim is:

1. In a photographic camera, a photographic objective which is adjustable for daylight exposures and flash bulb exposures, an adjustable diaphragm, a common guide number and diaphragm aperture adjusting ring provided with a guide number scale and with diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, a first means for automatically adjusting the aperture of said diaphragm in a predetermined relation based upon the setting of the first-mentioned adjusting ring to the adjusted guide number and the setting of the distance adjusting ring to the adjusted distance, and a second means for controlling and automatically limiting the range of distance values usable with the selected adjusted guide number.

2. In a photographic camera, a photographic objective which is adjustable for daylight exposures and flash bulb exposures, an adjustable diaphragm, a common guide number and diaphragm aperture adjusting ring provided with a guide umber scale and with a diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, said guide number and diaphragm aperture adjusting ring and said distance adjusting ring being arranged concentrically about the optical axis of asid objective, a first means for automatically adjusting the aperture of said diaphragm in a predetermined relation based upon the setting of the first-mentioned adjusting ring to the adjusted guide number and the setting of the distance adjusting ring to the adjusted distance, and a second means for controlling and automatically limiting the range of distance values useable with the selected adjusted guide number.

3. In a photographic camera, a photographic objective which is adjustable for daylight exposures and flash bulb exposures, an adjustable diaphragm, a common guide number and diaphragm aperture adjusting ring provided with a guide number scale and with a diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, said guide number and diaphragm aperture adjusting ring and said distance adjusting ring being arranged concentrically about the optical axis of said objective, a first means for automatically adjusting the aperture of said diaphragm in a predetermined relation based upon the setting of the first-mentioned adjusting ring to the adjusted guide number and the setting of the distance adjusting ring to the adjusted distance, and a second means for limiting the range of distance values useable with the selected adjusted guide number, said second means comprising a control cam on said guide number and diaphragm aperture adjusting ring, a lever arm pivoted about a stationary axis and yieldably urged with its free end into engagement with said cam, and a ratchet cam on said distance adjusting ring in which the steps on said ratchet correspond to the intervals between the gradations of said distance scale, said lever arm having a catch member thereon adapted to engage any one of the steps of said ratchet cam and thereby limit the adjusting range of said distance adjusting ring.

4. In a photographic camera, a photographic objective according to claim 3 in which said control cam is arranged on the inner circumference of said guide number and diaphragm aperture adjusting ring.

5. In a photographic camera, a photographic objective according to claim 3, in which said ratchet cam is arranged on the inner circumference of said distance adjusting ring.

6. In a photographic camera, a photographic objective according to claim 3, in which said ratchet cam is arranged on the inner circumference of said distance adjusting ring, the height of the steps on said ratchet cam increase in the direction in which the distance values on said distance scale decrease.

7. In a photographic camera, a photographic objective according to claim 3, in which said control cam causes said lever arm to be pivoted in such a manner that its angle of incidence with respect to the steps on said ratchet cam is small when the adjusted guide number is small, while this angle of incidence increases when the guide number and diaphragm aperture ring is adjusted to higher guide numbers.

8. In a photographic camera, a photographic objective according to claim 3, in which said control cam has such a pitch that the angle of incidence of said lever arm during the adjustment of said guide number scale from one value to the next value is adjusted a distance equal to one step of said ratchet cam.

9. In a photographic camera, a photographic objective which is adjustable for daylight exposures and flash bulb exposures, an adjustable diaphragm, a common guide number and diaphragm aperture adjusting ring provided with a guide number scale and with a diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, said guide number and diaphragm aperture adjusting ring and said distance adjusting ring being arranged concentrically about the optical axis of said objective, a first means for automatically adjusting the aperture of said diaphragm in predetermined relation based upon the setting of the first-mentioned adjusting ring to the adjusted guide number and the setting of the distance adjusting ring to the adjusted distance, and a second means for limiting the range of distance values useable with the selected adjusted guide number, said first means comprising the employment of a diaphragm provided with two rotatable diaphragm cages and diaphragm segments operatively connected with the same and additional means for operatively connecting one of said cages with said guide number and diaphragm aperture adjusting ring and for operatively connecting the other one of said cages with said distance adjusting ring, said second means comprising a control cam on said guide number and diaphragm aperture adjusting ring, a lever arm pivoted about a stationary axis and yieldably urged with is free end into engagement with said cam, and a ratchet cam on said distance adjusting ring in which the steps on said ratchet correspond to the intervals between the gradations of said distance scale, said lever arm having a catch member thereon adapted to engage any one of the steps of said ratchet cam and thereby limit the adjusting range of said distance adjusting ring.

10. In a photographic camera, a photographic objective which is adjustable for daylight exposures and flash bulb exposures, an adjustable diaphragm, a common guide number and diaphragm aperture adjusting ring provided with a guide number scale and with a diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, a first means for automatically adjusting the aperture of said diaphragm in a predetermined relation based upon the setting of the first-mentioned adjusting ring to the adjusted guide number and the setting of the distance adjusting ring to the adjusted distance, and a second means for limiting the range of distance values useable with the selected adjusted guide number, said first means comprises the employment of a diaphragm provided with two rotatable diaphragm cages and diaphragm segments operatively connected with the same, and additional means for operatively connecting one of said cages with said guide number and diaphragm aperture adjusting ring and for operatively connecting the other one of said cages with said distance adjusting ring, said additional means including a cam on said distance adjusting ring, a plurality of gear teeth on one of said diaphragm cages, a pivoted lever mounted between its ends about a stationary axis and engaging said cam with one of its ends while the other end of said lever carries a gear segment meshing with said gear teeth on said diaphragm cage.

11. In a photographic camera, a photographic objective which is adjustable for daylight exposures and flash bulb exposures, an adjustable diaphragm, a common guide number and diaphragm aperture adjusting ring provided with a guide number scale and with a diaphragm adjusting scale circumferentially displaced from said guide number scale said scales being movable with respect to a stationary index so that flashbulb exposures are made when the guide number scale is used and daylight exposures are made when the diaphragm aperture scale is used, a distance adjusting ring having a distance scale thereon, a first means for automatically adjusting the aperture of said diaphragm in a predetermined relation based upon the setting of the first-mentioned adjusting ring to the adjusted guide number and the setting of the distance adjusting ring to the adjusted distance, and a second means for limiting the range of distance values useable with the selected adjusted guide number, said first means comprises the employment of a diaphragm provided with two rotatable diphragm cages and diaphragm segments operatively connected with the same, and additional means for operatively connecting one of said cages with said guide number and diaphragm aperture adjusting ring and for operatively connecting the other one of said cages with said distance adjusting ring, said additional means including a cam on said distance adjusting ring, a plurality of gear teeth on one of said diaphragm cages, a pivoted lever mounted between its ends about a stationary axis and engaging said cam with one of its ends while the other end of said lever carries a gear segment meshing with said gear teeth on said diaphragm cage, the pitch of said cam being such that when said distance adjusting ring has been adjusted a distance equal to one interval of said distance scale said diaphragm cage has been rotated to vary the diaphragm aperture about one interval of said diaphragm aperture scale.

12. In a photographic camera, a photographic objective which is adjustable for daylight exposures and flash bulb exposures, an adjustable diaphragm, a common guide number and diaphragm aperture adjusting ring provided with a guide number scale and with a diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, a first means for automatically adjusting the aperture of said diaphragm in a predetermined relation based upon the setting of the first-mentioned adjusting ring to the adjusted guide number and the setting of the distance adjusting ring to the adjusted distance, and a second means for limiting the range of distance values useable with the selected adjusted guide number, said first means comprises the employment of a diaphragm provided with two rotatable diaphragm cages and diaphragm segments operatively connected with the same, and additional means for operatively connecting one of said cages with said guide number and diaphragm aperture adjusting ring and for operatively connecting the other one of said cages with said distance adjusting ring, said additional means including a cam on said distance adjusting ring, a plurality of gear teeth on one of said diaphragm cages, a pivoted lever mounted between its ends about a stationary axis and engaging said cam with one of its ends while the other end of said lever carries a gear segment meshing with said gear teeth on said diaphragm cage, and a radial arm on said other rotatable diaphragm cage which extends into the range of a projection on said guide number and diaphragm aperture adjusting ring.

13. In a photographic camera, a photographic objective according to claim 1, in which said stationary index is common to all of said three scales, and including on said guide number and diaphragm aperture adjusting ring disconnect cam means which render said first means inoperative and permit a manual adjustment of the diaphragm aperture independently of said distance adjusting ring.

14. In a photographic camera, a photographic objective according to claim 3, in which said stationary index is common to all of said three scales, and including on said guide number and diaphragm aperture adjusting ring disconnect cam means which render said first means inoperative and permit a manual adjustment of the diaphragm aperture independently of said distance adjusting ring, said cam means for rendering said second means inoperative moving said lever arm completely away from said ratchet cam on said distance adjusting ring.

15. In a photographic camera, a photographic objective which is adjustable for daylight exposures and flash bulb exposures, an adjustable diaphragm, a common guide number and diaphragm aperture adjusting ring provided with a guide number scale and with a diaphragm adjusting scale circumferentially displaced from said guide number scale, said scales being movable with respect to a stationary index so that flashbulb exposures are made when the guide number scale is used and daylight exposures are made when the diaphragm aperture scale is used, a distance adjusting ring having a distance scale thereon, a first means for automatically adjusting the aperture of said diaphragm in a predetermined relation based upon the setting of the first-mentioned adjusting ring to the adjusted guide number and the setting of the distance adjusting ring to the adjusted distance, and a second means for limiting the range of distance values useable with the selected adjusted guide number, said first means comprises the employment of a diaphragm provided with two rotatable diaphragm cages and diaphragm segments operatively connected with the same, and additional means for operatively connecting one of said cages with said guide number and diaphragm aperture adjusting ring and for operatively connecting the other one of said cages with said distance adjusting ring, said additional means including a cam on said distance adjusting ring, a plurality of gear teeth on one of said diaphragm cages, a pivoted lever mounted between its ends about a stationary axis and engaging said cam with one of its ends while the other end of said lever carries a gear segment meshing with said gear teeth and said diaphragm cage, a radial arm on said other rotatable diaphragm cage which extends into the range of a projection on said guide number and diaphragm aperture adjusting ring, and an Omega spring which extends concentrically around the optical axis of said photographic objective and has two outwardly extending ends which engage opposite sides of said radial arm and tends to rotate said other rotatable diaphragm cage into its initial position.

References Cited in the file of this patent
UNITED STATES PATENTS

| | | |
|---|---|---|
| 2,965,011 | Rentschler | Dec. 20, 1960 |
| 3,018,710 | Rentschler | Jan. 30, 1962 |

OTHER REFERENCES

German application Z4899 IX–57a, Mar. 8, 1956.